Jan. 5, 1926.
E. T. ATWELL
1,568,863
SIGNAL
Filed March 10, 1924    2 Sheets-Sheet 1
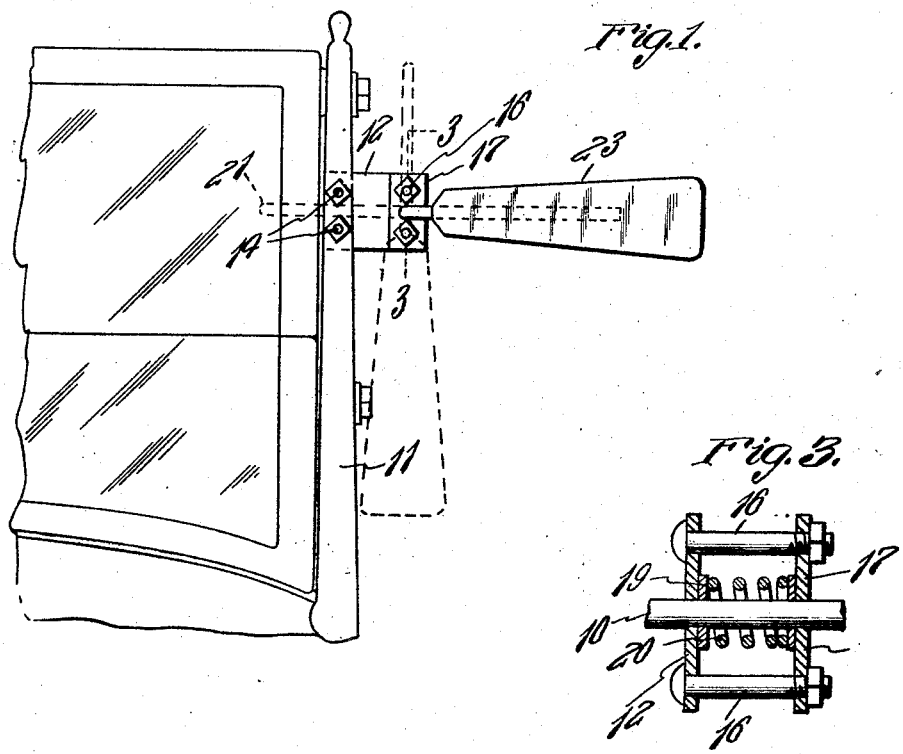
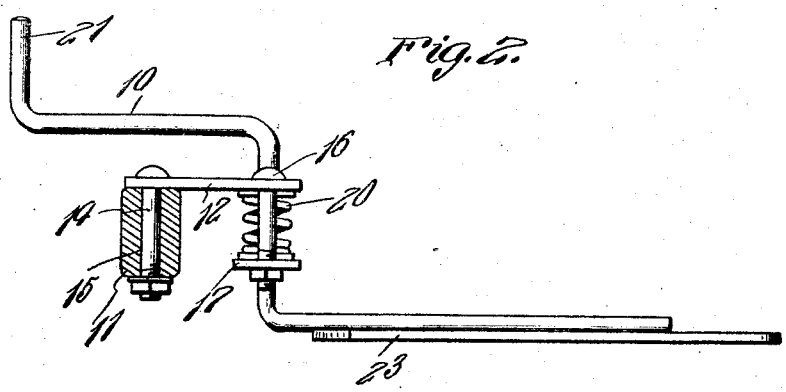

Jan. 5, 1926.
E. T. ATWELL
SIGNAL
1,568,863
Filed March 10, 1924   2 Sheets-Sheet 2
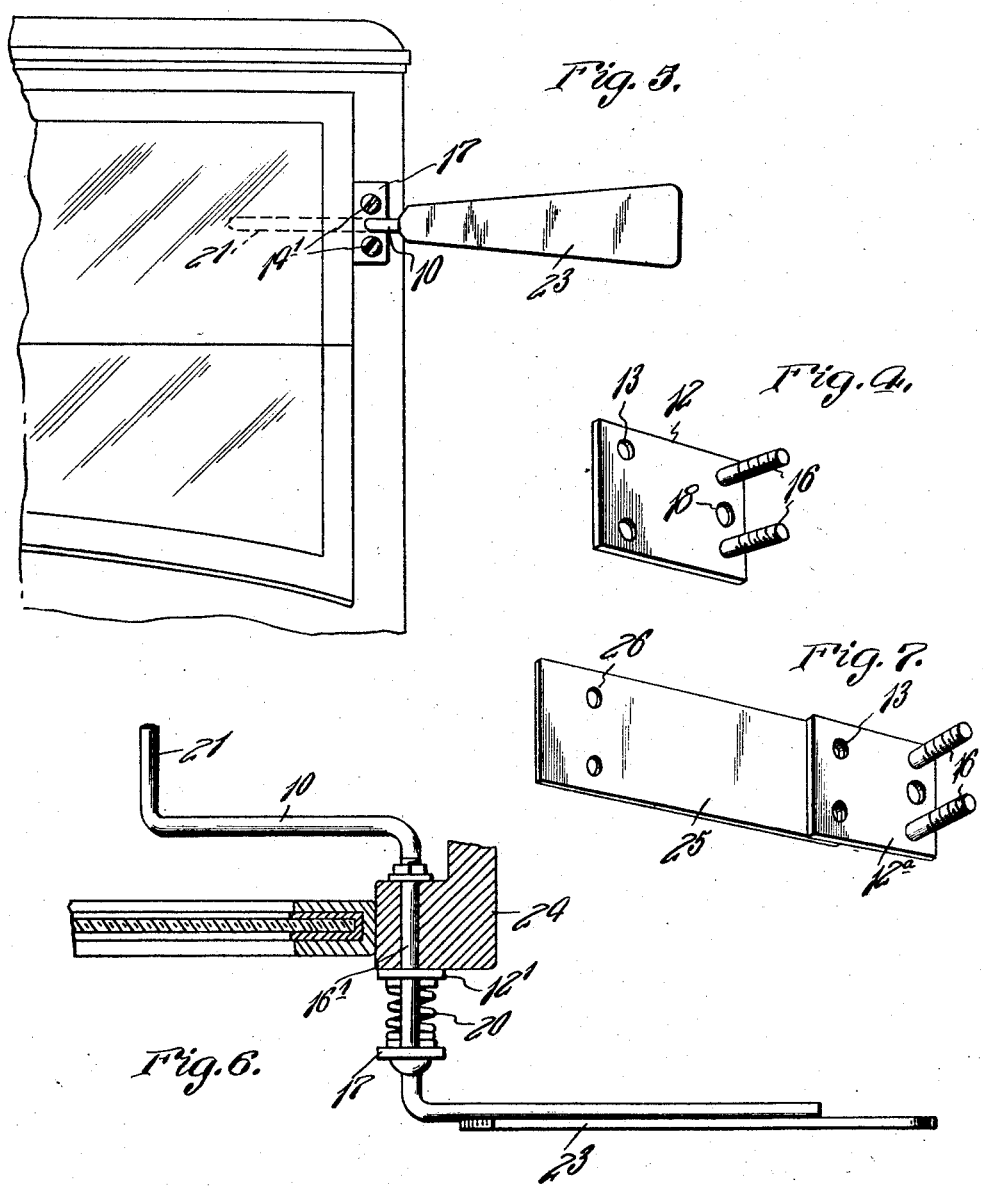

Patented Jan. 5, 1926.

1,568,863

UNITED STATES PATENT OFFICE.

ERNEST TAYLOR ATWELL, OF INDEPENDENCE, MISSOURI.

SIGNAL.

Application filed March 10, 1924. Serial No. 698,259.

*To all whom it may concern:*

Be it known that I, ERNEST T. ATWELL, a citizen of the United States, residing at Independence, in the county of Jackson and State of Missouri, have invented new and useful Improvements in Signals, of which the following is a specification.

This invention relates to improvements in vehicle signals especially designed for automobiles and has for an object the provision of a signal which is capable of use upon either closed or open types of automobiles.

Another object of the invention is the provision of a signal of this character which may be easily applied, conveniently operated and which may be adjusted to prevent accidental movement and objectionable rattling.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation showing a portion of an open automobile with the invention applied, the signal being shown by dotted lines in an inactive position.

Figure 2 is a horizontal sectional view.

Figure 3 is an enlarged section on the line 3—3 of Figure 1.

Figure 4 is a detail perspective view of the stationary plate.

Figure 5 is a fragmentary elevation showing the invention applied to a closed automobile.

Figure 6 is a horizontal sectional view of the same.

Figure 7 is a detail perspective view of a modified form of bracket to be used in attaching the signal to an open automobile.

Referring to the drawings in detail and especially to Figures 1, 2, 3 and 4, the invention as shown in these figures comprises a crank arm 10 which is designed to be mounted for rotation at one side of the windshield standard or frame 11. For this purpose there is provided a stationary plate 12 whose inner end is provided with spaced openings 13 for the passage of bolts 14, the latter also extending through spaced openings 15, provided in the standard 11, as shown in Figures 1 and 2 of the drawings. In addition the plate 12 is provided with spaced openings for the passage of combined adjusting and guide bolts 16, the latter passing through spaced openings provided in a relatively movable plate 17. The plates 12 and 17 are each provided with an opening 18 for the passage of the crank arm 10, the latter being inserted through the openings and thereafter bent into proper shape.

Mounted upon this crank arm between the plates 12 and 17 are washers 19, the latter bearing against the opposed faces of the plates 12 and 17. One of these washers is free upon the crank arm 10 while the other washer, that is, the one which bears against the plate 17, is secured to the crank arm and forms an annular flange or abutment, while located between this flange or abutment and the other washer 19 is a coiled spring 20 which surrounds the crank arm 10.

One end of the crank arm provides an operating handle 21, while the opposite end has secured thereto a semaphore or signal arm 23, the latter being normally positioned as shown by the dotted lines in Figure 1 and being adapted to be swung to the position shown in full lines in this figure when used for signaling.

By adjusting the ends of the bolts 16, the tension of the spring 20 may be regulated so that the crank arm 10 will be frictionally held against accidental movement and prevented from rattling.

In Figures 5 and 6 of the drawings, the invention is shown as applied to the frame or body of a closed automobile. In this form of the invention the crank arm extends through an opening provided in the windshield frame. The construction of this form of the invention is the same as that previously described, except that the stationary plate which is indicated at 12' is of substantially the same size as the relatively movable plate 17' and bears against the frame 24, while the combined guide and adjusting bolts 16' are of sufficient length to extend through openings provided in the frame 24 and serve as a means of securing the device to said frame.

A different method of securing the device to an open automobile is illustrated in Figure 7 in which the stationary plate 12ª has secured thereto an extended portion 25 whose outer end is provided with spaced openings 26. This extended portion 25 is made of comparatively thin bendable material and is designed to be bent around the frame 24 so that the openings 26 may be brought into register with the openings 13 of the plate 12ª and bolts or other suitable securing devices passed through these openings to clamp the plate to the frame 24.

The invention is susceptible of various changes in its form, proportions and minor details of construction and the right is herein reserved to make such changes as properly fall within the scope of the appended claims.

Having described the invention what is claimed is:—

1. A direction signal for vehicles comprising a rotatably mounted crank arm having one end located within convenient reach of the vehicle driver, a signal device at the opposite end of said arm designed to be moved to an active or an inactive position by rotation of the crank arm, spaced plates including a stationary plate and a relatively movable plate, both of said plates having openings therein for the passage of said arm, an annular flange secured to the arm and bearing against the inner face of the relatively movable plate, a washer bearing against the inner face of the stationary plate, a spring surrounding the arm between the flange and washer, and adjusting belts secured to the plates whereby the relatively movable plate may be adjusted to frictionally hold the arm against accidental movement.

2. A direction signal for vehicles comprising a rotatably mounted crank arm having one end located within convenient reach of the vehicle driver, a signal device at the opposite end of said arm designed to be moved to an active or an inactive position by rotation of the crank arm, spaced plates including a stationary plate and a relatively movable plate, both of said plates having openings therein for the passage of said arm, an annular flange secured to the arm and bearing against the inner face of the relatively movable plate, a washer bearing against the inner face of the stationary plate, a spring surrounding the arm between the flange and washer, and combined guide and adjusting bolts extending through the plates upon opposite sides of the arm whereby the movable plate may be adjusted to frictionally hold the arm against accidental movement.

In testimony whereof I affix my signature

ERNEST TAYLOR ATWELL.